(12) United States Patent
Mathison

(10) Patent No.: US 9,586,806 B2
(45) Date of Patent: *Mar. 7, 2017

(54) HYDROGEN FUEL DISPENSER WITH PRE-COOLING CIRCUIT

(71) Applicant: Honda Motor Co., Ltd., Tokyo (JP)

(72) Inventor: Steve Mathison, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 310 days.

This patent is subject to a terminal disclaimer.

(21) Appl. No.: 14/203,702

(22) Filed: Mar. 11, 2014

(65) Prior Publication Data

US 2014/0263419 A1 Sep. 18, 2014

Related U.S. Application Data

(63) Continuation-in-part of application No. 14/154,339, filed on Jan. 14, 2014, now Pat. No. 9,464,762.

(Continued)

(51) Int. Cl.
*B65B 1/20* (2006.01)
*B67D 7/80* (2010.01)
*F17C 5/06* (2006.01)

(52) U.S. Cl.
CPC ............... *B67D 7/80* (2013.01); *F17C 5/06* (2013.01); *F17C 2205/037* (2013.01);
(Continued)

(58) Field of Classification Search
CPC ..... F17C 2227/0337–2227/0339; F17C 5/007; F17C 5/02; F17C 5/04; F17C 5/06;
(Continued)

(56) References Cited

U.S. PATENT DOCUMENTS 3,165,149 A * 1/1965 Raible ................... G01N 30/30
165/263
4,211,537 A * 7/1980 Teitel ........................ C01B 3/00
123/3

(Continued)

OTHER PUBLICATIONS

Office Action of U.S. Appl. No. 14/154,339 dated Oct. 20, 2015, 11 pages.

(Continued)

*Primary Examiner* — Timothy L Maust
*Assistant Examiner* — Randall Gruby
(74) *Attorney, Agent, or Firm* — Rankin, Hill & Clark LLP

(57) ABSTRACT

A hydrogen fuel dispenser includes a pre-cooling circuit, a hydrogen fuel storage for storing hydrogen fuel, a nozzle for dispensing hydrogen fuel to a receptacle, and a fueling line connecting the hydrogen fuel storage to the nozzle for communicating hydrogen fuel from the hydrogen fuel storage to the nozzle. The pre-cooling circuit is provided to cool hydrogen fuel in the fueling line, and includes a pre-cooling line connected to the fueling line downstream from the hydrogen fuel storage, and a flow-path selector provided at a connection between the fueling line and the pre-cooling line. The flow-path selector selectively: blocks hydrogen fuel flow between the fueling line and the pre-cooling line while opening hydrogen fuel flow between the fueling line and a nozzle line of the nozzle; and opens hydrogen fuel flow between the fueling line and the pre-cooling line.

10 Claims, 7 Drawing Sheets

Related U.S. Application Data

(60) Provisional application No. 61/786,982, filed on Mar. 15, 2013.

(52) U.S. Cl.
CPC .......... F17C 2205/0335 (2013.01); F17C 2205/0352 (2013.01); F17C 2221/012 (2013.01); F17C 2223/0123 (2013.01); F17C 2225/036 (2013.01); F17C 2227/0157 (2013.01); F17C 2227/039 (2013.01); F17C 2227/0337 (2013.01); F17C 2250/01 (2013.01); F17C 2250/0439 (2013.01); F17C 2250/0443 (2013.01); F17C 2265/065 (2013.01); F17C 2270/0168 (2013.01); F17C 2270/0184 (2013.01); Y02E 60/321 (2013.01)

(58) Field of Classification Search
CPC .. F17C 7/00; F17C 7/02; F17C 13/026; F17C 2250/04–2250/0495; F17C 2250/06–2250/0694
USPC .................. 141/82, 83, 94, 95, 98
See application file for complete search history.

(56) References Cited

U.S. PATENT DOCUMENTS

| | | | | |
|---|---|---|---|---|
| 4,883,099 A * | 11/1989 | Vanommeren | ........... | F17C 5/02 141/1 |
| 5,121,609 A * | 6/1992 | Cieslukowski | ........... | F17C 7/02 123/525 |
| 5,228,295 A | 7/1993 | Gustafson | | |
| 5,238,030 A * | 8/1993 | Miller | ........... | F17C 5/007 137/80 |
| 5,259,424 A * | 11/1993 | Miller | ........... | F17C 5/007 137/80 |
| 5,353,849 A | 10/1994 | Sutton et al. | | |
| 5,359,968 A * | 11/1994 | Shiraishi | ........... | F02B 43/10 123/3 |
| 5,360,139 A | 11/1994 | Goode | | |
| 5,375,582 A * | 12/1994 | Wimer | ........... | F17C 9/04 123/525 |
| 5,409,676 A * | 4/1995 | Nasako | ........... | F28D 20/003 165/101 |
| 5,411,374 A | 5/1995 | Gram | | |
| 5,505,232 A | 4/1996 | Barclay | | |
| 5,616,838 A | 4/1997 | Preston et al. | | |
| 5,954,101 A | 9/1999 | Drube et al. | | |
| 5,980,608 A * | 11/1999 | Dietz | ........... | F17C 11/00 95/104 |
| 6,044,647 A | 4/2000 | Drube et al. | | |
| 6,152,191 A * | 11/2000 | Chan | ........... | F17C 5/007 141/18 |
| 6,182,717 B1 * | 2/2001 | Yamashita | ....... | B60K 15/03006 141/18 |
| 6,354,088 B1 | 3/2002 | Emmer et al. | | |
| 6,381,514 B1 * | 4/2002 | Hartsell, Jr. | ........... | B67D 7/145 700/236 |
| 6,595,048 B1 * | 7/2003 | Drube | ........... | F17C 9/00 73/195 |
| 6,598,624 B2 * | 7/2003 | Togasawa | ........... | F16K 17/30 141/1 |
| 6,644,039 B2 | 11/2003 | Hughes et al. | | |
| 6,810,925 B2 * | 11/2004 | Graham | ........... | B60S 5/02 141/18 |
| 7,021,341 B2 * | 4/2006 | Viegas | ........... | F17C 5/007 141/59 |
| 7,128,103 B2 | 10/2006 | Mitlitsky et al. | | |
| 7,550,219 B2 | 6/2009 | Uozumi | | |
| 7,637,292 B2 * | 12/2009 | Handa | ........... | F17C 5/007 141/82 |
| 7,757,726 B2 * | 7/2010 | Handa | ........... | F17C 1/00 141/18 |
| 7,757,727 B2 | 7/2010 | Handa | | |
| 7,987,877 B2 | 8/2011 | Bavarian et al. | | |
| 8,065,883 B2 | 11/2011 | Pozivil | | |
| 8,069,885 B2 * | 12/2011 | Kederer | ........... | F17C 5/007 141/104 |
| 8,365,777 B2 * | 2/2013 | Farese | ........... | F17C 13/026 141/4 |
| 8,733,590 B2 | 5/2014 | Bartlett et al. | | |
| 8,746,274 B2 * | 6/2014 | Izutani | ........... | C01B 3/00 137/334 |
| 8,752,596 B2 * | 6/2014 | Mori | ........... | F17C 5/06 141/82 |
| 8,770,012 B2 * | 7/2014 | Yahashi | ........... | G01M 3/26 73/40 |
| 9,163,785 B2 | 10/2015 | Mackey | | |
| 2002/0029820 A1 * | 3/2002 | Ovshinsky | ........... | B22F 9/008 141/110 |
| 2002/0029821 A1 * | 3/2002 | Ovshinsky | ........... | B22F 9/008 141/231 |
| 2002/0170347 A1 * | 11/2002 | Stabile | ........... | F17C 13/02 73/149 |
| 2003/0175564 A1 | 9/2003 | Mitlitsky et al. | | |
| 2003/0233206 A1 * | 12/2003 | White | ........... | F17C 5/007 702/116 |
| 2004/0016769 A1 * | 1/2004 | Redmond | ........... | B82Y 30/00 222/3 |
| 2005/0016185 A1 | 1/2005 | Emmer et al. | | |
| 2005/0077252 A1 * | 4/2005 | Shih | ........... | H01M 8/04029 210/767 |
| 2005/0175874 A1 * | 8/2005 | Alessi, Jr. | ........... | H01M 8/04029 429/429 |
| 2006/0005895 A1 * | 1/2006 | Gram | ........... | F04B 5/02 141/104 |
| 2006/0016512 A1 * | 1/2006 | Takano | ........... | F17C 5/007 141/82 |
| 2006/0156742 A1 | 7/2006 | Farese et al. | | |
| 2006/0174965 A1 * | 8/2006 | Hobbs | ........... | C01B 3/34 141/18 |
| 2007/0000016 A1 * | 1/2007 | Handa | ........... | B60K 15/00 2/158 |
| 2007/0079892 A1 * | 4/2007 | Cohen | ........... | F17C 5/007 141/105 |
| 2007/0113918 A1 * | 5/2007 | Kanoya | ........... | F17C 5/06 141/82 |
| 2007/0227614 A1 * | 10/2007 | Kurita | ........... | B60S 5/02 141/26 |
| 2007/0257043 A1 | 11/2007 | Kanoya et al. | | |
| 2008/0035235 A1 * | 2/2008 | Kobayashi | ........... | B60K 15/00 141/94 |
| 2008/0185068 A1 * | 8/2008 | Cohen | ........... | F17C 5/007 141/94 |
| 2008/0210185 A1 * | 9/2008 | Kubo | ........... | B60H 1/00257 123/1 A |
| 2008/0216914 A1 * | 9/2008 | Handa | ........... | F17C 13/12 141/4 |
| 2008/0264514 A1 * | 10/2008 | Tessier | ........... | B01D 53/0438 141/4 |
| 2009/0025824 A1 * | 1/2009 | Noujima | ........... | C01B 3/501 141/93 |
| 2009/0107577 A1 * | 4/2009 | Allidieres | ........... | F17C 5/007 141/1 |
| 2009/0297896 A1 | 12/2009 | Kimbara et al. | | |
| 2011/0303313 A1 * | 12/2011 | Hopkins | ........... | F17C 11/005 137/625.4 |
| 2012/0000574 A1 * | 1/2012 | Nishiumi | ........... | F17C 5/06 141/94 |
| 2012/0097292 A1 * | 4/2012 | De Jongste | ........... | F17C 5/06 141/4 |
| 2012/0125482 A1 * | 5/2012 | Mori | ........... | F17C 5/007 141/98 |
| 2012/0137708 A1 | 6/2012 | Mackey | | |
| 2012/0192989 A1 | 8/2012 | Schulze | | |
| 2012/0227864 A1 * | 9/2012 | Mori | ........... | F17C 5/06 141/95 |
| 2012/0298256 A1 * | 11/2012 | Mori | ........... | F17C 5/007 141/94 |

(56) References Cited

U.S. PATENT DOCUMENTS

| | | | | |
|---|---|---|---|---|
| 2013/0014854 A1* | 1/2013 | Mori | ............... | F17C 5/007 141/1 |
| 2013/0037165 A1* | 2/2013 | Okawachi | ............... | F17C 5/06 141/4 |
| 2013/0061983 A1* | 3/2013 | Komiya | ............... | B65B 3/04 141/98 |
| 2014/0007975 A1* | 1/2014 | Cohen | ............... | F17C 5/06 141/11 |
| 2014/0102587 A1* | 4/2014 | Nagura | ............... | H01M 8/04208 141/69 |
| 2014/0170530 A1* | 6/2014 | Kawaura | ............... | H01M 8/04201 429/515 |
| 2014/0196814 A1* | 7/2014 | Nagura | ............... | F17C 5/06 141/82 |
| 2014/0261874 A1* | 9/2014 | Mathison | ............... | F17C 5/007 141/11 |
| 2014/0263419 A1* | 9/2014 | Mathison | ............... | B67D 7/80 222/3 |
| 2014/0332114 A1* | 11/2014 | Nagura | ............... | F17C 13/025 141/4 |

OTHER PUBLICATIONS

Office Action of U.S. Appl. No. 14/154,339 dated Mar. 16, 2016, 19 pages.

* cited by examiner

HYDROGEN FUEL DISPENSER WITH PRE-COOLING CIRCUIT

CROSS-REFERENCE TO RELATED APPLICATIONS

This application claims priority to U.S. Provisional Patent Application Ser. No. 61/786,982, filed Mar. 15, 2013, the contents of which are hereby incorporated in full by reference. This application is a continuation-in-part of U.S. patent application Ser. No. 14/154,339, filed Jan. 14, 2014.

BACKGROUND

Hydrogen fuel dispensers at hydrogen fuel filling stations are provided to dispense hydrogen fuel to a receptacle. For example, hydrogen fuel dispensers may dispense hydrogen fuel to a hydrogen fuel tank provided in a vehicle (automobile) configured to operate using the hydrogen fuel as a fuel source.

When performing a fueling operation, the hydrogen fuel dispenser may control the fueling in a manner that prevents the hydrogen fuel tank from overheating (to a temperature exceeding 85° C.) and/or from overfilling (to a pressure exceeding 125% of normal working pressure (NWP)). The control of the fueling operation by the hydrogen fuel dispenser may be influenced by a temperature of the hydrogen fuel at the outset of fueling. Accordingly, control of the fueling operation may be facilitated by having the temperature of the hydrogen fuel at the outset of fueling fall within a desired or predictable range.

However, the temperature of the hydrogen fuel at the outset of fueling may vary since the hydrogen fuel dispenser may be susceptible to heating between hydrogen fuel fills. In this regard, the hydrogen fuel dispenser may include components, such as those components through which hydrogen fuel flows, that are exposed to an external environment. When the hydrogen fuel dispenser is not used for a period of time, the components of the hydrogen fuel dispenser may warm up. This warming may be a result of the sun hitting the hydrogen fuel dispenser or the ambient temperature surrounding the hydrogen fuel dispenser, especially in warm climate locations. The heating of the hydrogen fuel dispenser may heat the hydrogen fuel, which may affect calculations performed by the hydrogen fuel dispenser when controlling the fueling operation of filling the hydrogen fuel tank (receptacle).

BRIEF DESCRIPTION

According to one aspect, a hydrogen fuel dispenser includes a nozzle, a fueling line, a pre-cooling line, and a flow-path selector. The nozzle is for dispensing hydrogen fuel to a receptacle and includes a nozzle line through which hydrogen fuel is dispensed to the receptacle. The fueling line connects the nozzle line to a hydrogen fuel storage for communicating hydrogen fuel from the hydrogen fuel storage to the nozzle line. The pre-cooling line is connected to the fueling line downstream from the hydrogen fuel storage for pre-cooling hydrogen fuel. The flow-path selector is provided at a connection between the fueling line and the pre-cooling line. The flow-path selector selectively blocks hydrogen fuel flow between the fueling line and the pre-cooling line while opening hydrogen fuel flow between the fueling line and the nozzle line, and opens hydrogen fuel flow between the fueling line and the pre-cooling line.

According to another aspect, a pre-cooling controller is provided for a hydrogen fuel dispenser having a fueling line connecting a hydrogen fuel storage and a nozzle line of a nozzle for dispensing hydrogen fuel to a receptacle, a pre-cooling circuit including a pre-cooling line connected to the fueling line at a position downstream from the hydrogen fuel storage, and a flow-path selector provided at a connection between the fueling line and the pre-cooling line. The flow-path selector selectively blocks hydrogen fuel flow between the fueling line and the pre-cooling line while opening hydrogen fuel flow between the fueling line and the nozzle line, and opens hydrogen fuel flow between the fueling line and the pre-cooling line. The pre-cooling controller includes a condition detector and a flow-path selector controller. The condition detector detects a predetermined hydrogen fuel dispenser condition. The flow-path selector controller controls the flow-path selector to: open hydrogen fuel flow between the fueling line and the pre-cooling line when the predetermined hydrogen fuel dispenser condition is detected by the condition detector; and otherwise block hydrogen fuel flow between the fueling line and the pre-cooling line while opening hydrogen fuel flow between the fueling line and the nozzle line.

According to another aspect, a hydrogen fuel dispenser includes a nozzle, a fueling line, a pre-cooling circuit, and a holster. The nozzle is for dispensing hydrogen fuel to a receptacle, and includes a nozzle line through which hydrogen fuel is dispensed to the receptacle. The fueling line connects the nozzle line to a hydrogen fuel storage for communicating hydrogen fuel from the hydrogen fuel storage to the nozzle line. The pre-cooling circuit has a pre-cooling line. The holster is for stowing the nozzle, and includes a downstream pre-cooling line connected to the pre-cooling line. The nozzle line engages and communicates with the downstream pre-cooling line when the nozzle is stowed in the holster so that hydrogen fuel flows from the fueling line into the pre-cooling line through the nozzle line and the downstream pre-cooling line.

BRIEF DESCRIPTION OF THE DRAWINGS

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures where like reference numbers indicate identical or functionally similar elements.

Figure 1:
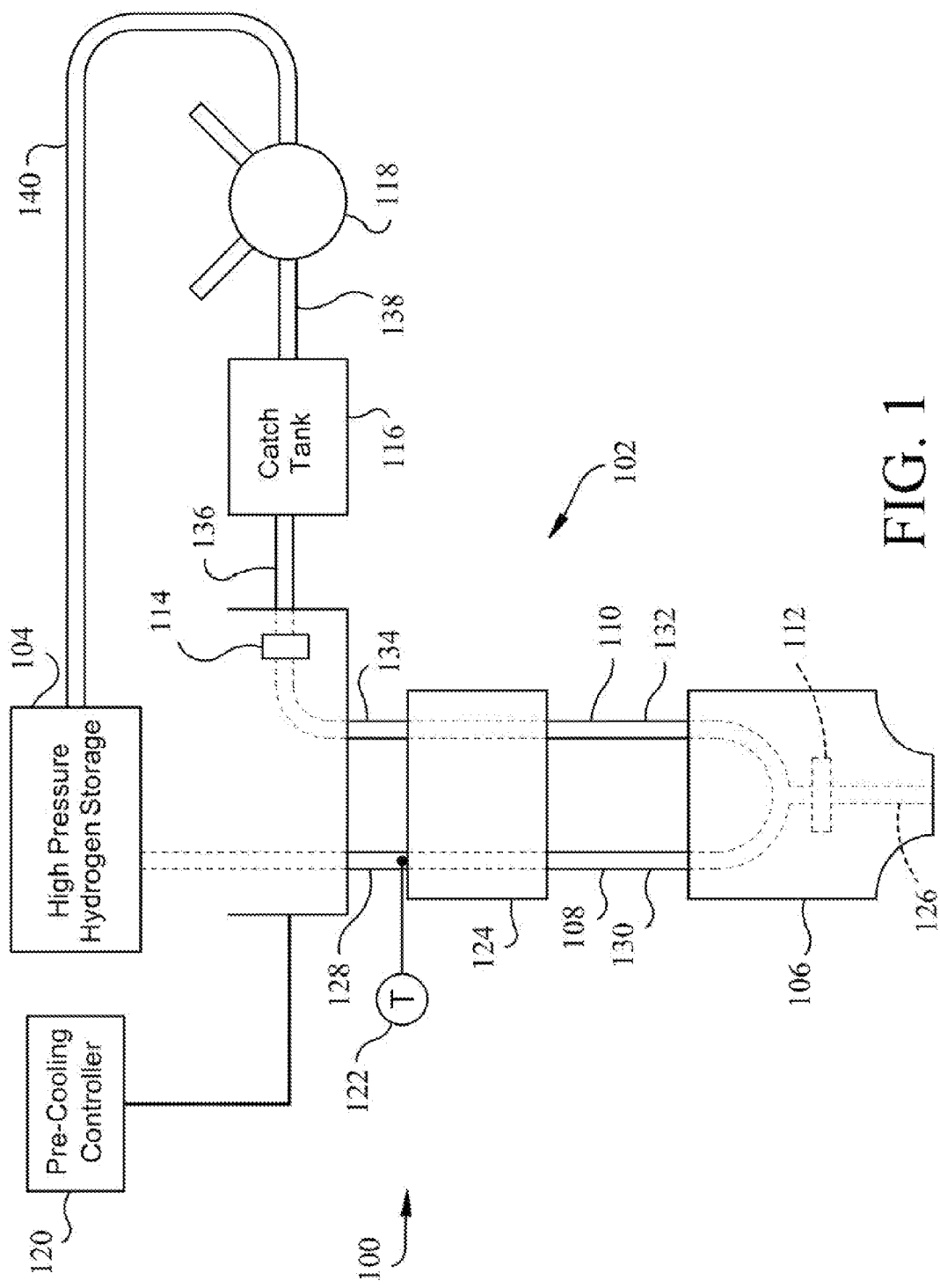
FIG. 1 is a schematic illustration of an exemplary hydrogen fuel dispenser which includes a pre-cooling circuit in accordance with one embodiment of the present application.

Referring to FIG. 1, a hydrogen fuel dispenser 100 (hereinafter, "dispenser 100") includes a pre-cooling circuit 102 for cooling hydrogen fuel between hydrogen fuel fills. In this regard, when hydrogen fuel flows through the hydrogen fuel dispenser 100, it can cool the components of the hydrogen fuel dispenser through which it flows. Accordingly, the pre-cooling circuit 102 is provided to circulate the hydrogen fuel in the hydrogen fuel dispenser between hydrogen fuel fills so as to cool and/or prevent the heating of the hydrogen fuel and/or the components of the dispenser 100.

The dispenser 100 may include a hydrogen fuel storage 104, a nozzle 106, and a fueling line 108. The dispenser 100 may also include a pre-cooling circuit 102, which may include a pre-cooling line 110, a flow-path selector 112, a back-flow valve 114, a catch tank 116, a compressor 118, and a pre-cooling controller 120. The dispenser 100 may also include a temperature sensor 122 in the fueling line 108, and a breakaway 124 which engages the fueling line 108 and the pre-cooling line 110.

The hydrogen fuel storage 104 may include one or more tanks in which hydrogen fuel is stored at high pressure. In the configuration shown in FIG. 1, the hydrogen fuel storage 104 communicates with the fueling line 108. The below description describes the fueling line 108 as communicating directly with the hydrogen fuel storage 104. However, the fueling line 108 may not directly communicate with the hydrogen fuel storage 104.

For example, the hydrogen fuel storage 104 may also communicate with a hydrogen fuel source (not shown), which may be a large storage for hydrogen fuel. The hydrogen fuel storage 104 may communicate with the fueling line 108 in parallel with the hydrogen fuel source, with the hydrogen fuel storage 104 and the hydrogen fuel source each independently communicating with the fueling line 108. Alternatively, the hydrogen fuel storage 104 may communicate with the fueling line 108 in series with the hydrogen fuel source, with one of the hydrogen fuel source or the hydrogen fuel storage 104 feeding into the other, which then feeds into the fueling line 108.

The nozzle 106 may take the form of any element which is capable of engaging a receptacle (e.g., a vehicle hydrogen fuel tank) for dispensing hydrogen fuel to the receptacle. The nozzle 106 may include a nozzle line 126 with an output end provided to dispense hydrogen fuel at a portion of the nozzle 106 configured to be received in or at an opening of the receptacle.

The fueling line 108 may be a conduit which connects the hydrogen fuel storage 104 to the nozzle 106. The fueling line 108 may take the form of one or more hoses, or any other elements capable of connecting the hydrogen fuel storage 104 to the nozzle 106 such that hydrogen fuel from the hydrogen fuel storage 104 is communicated to the nozzle 106 for dispensing to the receptacle. The fueling line 108 may connect to the hydrogen fuel storage 104 at a first end thereof, and to the nozzle 106 and nozzle line 126 at a second end thereof. The fueling line 108 may connect to the nozzle line 126 at a position within the nozzle 106. The fueling line 108 thereby allows hydrogen fuel to flow from the hydrogen fuel storage 104 to the nozzle 106 and nozzle line 126 for dispensing into the receptacle.

The breakaway 124 may be provided along the fueling line 108 between the first and second ends thereof. For engagement with breakaway 124, the fueling line 108 may include two portions: a first portion 128 extending between the hydrogen fuel storage 104 and the breakaway 124; and a second portion 130 extending between the breakaway 124 and the nozzle 106. Each of the first and second portions 128, 130 of the fueling line 108 may be connected to the breakaway via fittings, etc., which are not shown in the drawings. The first and second portions 128, 130 of the fueling line 108 may be two separate pieces or two portions of a single conduit (e.g. a single hose), or may be two separate conduits joined to one another. The fueling line 108 defines a continuous conduit through the breakaway, so that even if provided as two separate pieces (i.e., the first and second portions 128, 130 are separate pieces), the two pieces connect to define a continuous conduit.

The temperature sensor 122 may be provided along the fueling line 108 at a position within or in the vicinity of the breakaway 124. The temperature sensor 122 may take the form of any temperature sensing element, and may sense the temperature of at least one of the hydrogen fuel in the fueling line 108, the fueling line 108, the nozzle 106, the breakaway 124, and any fittings used to connect these elements to one another. In this regard, the temperature sensor 122 may include a plurality of temperature sensing elements (which may all be the same or different types of temperature sensing elements).

During a fueling operation, hydrogen fuel from the hydrogen fuel storage 104 may be communicated (i.e., flow) to the nozzle 106 via the fueling line 108, and dispensed to the receptacle from the nozzle 106. To perform the fueling operation, a user engages the nozzle 106 with the receptacle, and initiates hydrogen fuel dispensing from the nozzle 106 by, e.g., actuating a fueling button. The particular details of the hydrogen fuel dispensing are not described herein. It is to be appreciated that the dispenser 100 may include components and controllers not illustrated in the drawings or described herein for the purpose of performing and controlling the fueling operation. Once the hydrogen fuel dispensing is completed, the user disengages the nozzle 106 from the receptacle and the fueling operation is thereby discontinued.

Upon discontinuation of the fueling operation, hydrogen fuel may remain in the fueling line 108. As the hydrogen fuel flows through the fueling line 108 during the fueling operation, it can cool the fueling line 108, the breakaway 124, the nozzle 106, and any fittings used to connect these elements to one another. As time passes without a subsequent fueling operation, the fueling line 108, the breakaway 124, the nozzle 106, the fittings, and the hydrogen fuel within these elements may be heated by the sun or the ambient environment. As noted above, this may especially be the case in warm climates.

The fittings used to connect the fueling line 108 to the breakaway 124 may have a lot of heat mass, and therefore may be susceptible to heating by the sun or the ambient environment. Furthermore, while the nozzle 106 and fueling line 108 may be covered with a rubber sheath, the rubber sheath may be black and therefore susceptible to absorbing heat. The heating of the fueling line 108, the breakaway 124, the nozzle 106, and the fittings may result in a heating of the hydrogen fuel which is in the fueling line 108 or which passes through the fueling line 108 at a beginning stage of the fueling operation. This heating may affect the calculations performed during controlled operation of the dispenser 100.

As noted above, to prevent this heating of the fueling line 108, the breakaway 124, the nozzle 106, the fittings, and the hydrogen fuel between fueling operations, the dispenser 100 may be provided with the pre-cooling circuit 102. Generally, the pre-cooling circuit 102 circulates hydrogen fuel to effect a cooling of the hydrogen fuel, the fueling line 108, the breakaway 124, the nozzle 106, and the fittings. By cooling the hydrogen fuel and/or the components of the dispenser 100, the hydrogen fuel temperature at the outset of the fueling operation may be maintained in a desired range, and fueling efficiency may be improved (i.e., a time for fueling while preventing overheating and overfilling may be reduced).

As shown in FIG. 1, the pre-cooling circuit 102 may include the pre-cooling line 110, the flow-path selector 112, the back-flow valve 114, the catch tank 116, the compressor 118, and the pre-cooling controller 120. The pre-cooling line 110 may be formed substantially similarly to the fueling line 108. That is, the pre-cooling line 110 may be a conduit through which hydrogen fuel passes, and may take the form of one or more hoses or any other elements capable of allowing hydrogen fuel to flow therethrough and being formed in the herein-described manner. The pre-cooling line 110 is connected at a first end to the fueling line 108, and communicates the fueling line 108 to the hydrogen fuel storage 104. In this regard, the pre-cooling line 110 may be connected at a second end to the hydrogen fuel storage 104, as shown in FIG. 1, may be indirectly connected to the hydrogen fuel storage 104, or may be otherwise connected to communicate hydrogen fuel back into the fueling line 108.

The pre-cooling line 110 may be connected to the fueling line 108 at any position downstream from the hydrogen fuel storage 104. As shown, the pre-cooling line 110 is connected to the fueling line 108 in the nozzle 106 at a position in the vicinity of the connection between the fueling line 108 and the nozzle line 126.

Along the pre-cooling line 110, between the fueling line 108 and the hydrogen fuel storage 104 (or other terminal point of the pre-cooling line 110), the breakaway 124, the back-flow valve 114, the catch tank 116, and the compressor 118 are provided. The pre-cooling line 110 may include: a first portion 132 extending between the fueling line 108 and the breakaway 124; a second portion 134 extending between the breakaway 124 and the back-flow valve 114; a third portion 136 extending between the back-flow valve 114 and the catch tank 116; a fourth portion 138 extending between the catch tank 116 and the compressor 118; and a fifth portion 140 extending between the compressor 118 and the hydrogen fuel storage 104. Each of the first to fifth portions 132-140 of the pre-cooling line 110 may be conduits through which hydrogen fuel is communicated from the fueling line 108 to the catch tank 116, the compressor 118, and the hydrogen fuel storage 104 (or other terminal point of the pre-cooling line 110). The first to fifth portions 132-140 of the pre-cooling line 110 may be separate portions which are joined to the components provided on either end thereof, or may be parts of a common conduit (e.g., a hose).

The flow-path selector 112 may be provided at the connection between the fueling line 108 and the pre-cooling line 110. The flow-path selector 112 is provided to selectively block/open communication (hydrogen fuel flow) between the fueling line 108 and the pre-cooling line 110, and the fueling line 108 and the nozzle line 126 (the nozzle). In this regard, the flow-path selector 112 may take the form of any element or gas flow controlling mechanism capable of regulating and controlling a flow of hydrogen fuel from the fueling line 108 to the pre-cooling line 110 and the nozzle line 126 (the nozzle). For example, the flow-path selector 112 may be a three-way valve.

The flow-path selector 112 is provided to change the dispenser 100 between a fueling state and a pre-cooling state. In the fueling state, the flow-path selector 112 opens a flow-path between the fueling line 108 and the nozzle line 126 (the nozzle) so as to open communication (hydrogen fuel flow) between the two, and blocks a flow-path between the fueling line 108 and the pre-cooling line 110 so as to block communication (hydrogen fuel flow) between the two. Therefore, in the fueling state hydrogen fuel may flow from the hydrogen fuel storage 104, through the fueling line 108, to the nozzle 106 and the nozzle line 126 for dispensing into the receptacle. Hydrogen fuel is prevented from flowing into the pre-cooling line 110.

In the pre-cooling state, the flow-path selector 112 opens the flow-path between fueling line 108 and the pre-cooling line 110 so as to open communication (hydrogen fuel flow) between the two. The flow-path selector 112 may also block communication (hydrogen fuel flow) between the fueling line 108 and the nozzle line 126 (the nozzle). Therefore, in the pre-cooling state hydrogen fuel may flow from the fueling line 108 to the pre-cooling line 110. Hydrogen fuel may also be prevented from flowing into the nozzle line 126 (the nozzle).

The breakaway 124 may be provided along the pre-cooling line 110 at a position between the connection to the fueling line 108 and the back-flow valve 114. Accordingly, the breakaway 124 may be provided between the first and second portions 132, 134 of the pre-cooling line 110. Each of the first and second portions 132, 134 of the pre-cooling line 110 may be connected to the breakaway 124 via fittings, etc., which are not shown in the drawings.

The back-flow valve 114 may take the form of any element, valve, or gas flow controlling element. The back-flow valve 114 is operable to open and close a flow path through the pre-cooling line 110 between the second and third portions 134, 136 of the pre-cooling line 110. The back-flow valve 114 may be controlled (as described below) to block the pre-cooling line 110 when the dispenser 100 is in the fueling state so as to prevent hydrogen fuel from the fueling line 108 from reaching the catch tank 116, and to prevent hydrogen fuel from the catch tank 116 from returning to the pre-cooling line 110 and the fueling line 108. The back-flow valve 114 may be controlled (as described below) to open the pre-cooling line 110 between the second and third portions 134, 136 when the dispenser 100 is in the pre-cooling state.

The catch tank 116 may include one or more tanks in which hydrogen fuel is stored at low pressure. When the dispenser 100 is in the pre-cooling state, hydrogen fuel from the fueling line 108 may be fed through the first, second, and third portions 132-136 of the pre-cooling line 110 into the catch tank 116. The hydrogen fuel received in the catch tank 116 is at a low (relatively) pressure. The hydrogen fuel in the catch tank 116 may, at least temporarily, be stored therein.

The compressor 118 is disposed downstream from the catch tank 116, compresses hydrogen fuel from the catch tank 116, and passes the compressed hydrogen fuel to the hydrogen fuel storage 104. Accordingly, the hydrogen fuel directed to and stored in the hydrogen fuel storage 104 is at high pressure. The compressor 118 may take the form of any element capable of compressing and/or pressurizing a gas that is suitable for the herein-described dispenser 100 and pre-cooling circuit 102.

In operation, when the dispenser 100 is in the pre-cooling state, the flow-path selector 112 opens communication (hydrogen fuel flow) between the fueling line 108 and the pre-cooling line 110 (and may block hydrogen fuel flow between the fueling line 108 and the nozzle, i.e., the nozzle line 126), and the back-flow valve 114 opens communication (hydrogen fuel flow) through the pre-cooling line 110 between the second and third portions 134, 136 thereof. Hydrogen fuel is then fed from the fueling line 108 to the pre-cooling line 110 and into the catch tank 116. From the catch tank 116, the hydrogen fuel is compressed by the compressor 118 and fed into the hydrogen fuel storage 104.

This causes the hydrogen fuel in the fueling line 108 to move through the fueling line 108 and the pre-cooling line 110, thereby cooling the fueling line 108, the nozzle 106, the breakaway 124, any fittings provided along the fueling line 108, and the pre-cooling line 110. It is noted that by the configuration shown in FIG. 1, the pre-cooling line 110 runs parallel to the fueling line 108, and connects to the fueling line 108 at a terminal end thereof. The pre-cooling line 110 is also connected to the breakaway 124 and nozzle 106. By providing the pre-cooling line 110 and fueling line 108 in the shown manner, hydrogen fuel may flow through an entire length of the fueling line 108, so as to cool all components along the fueling line 108 (e.g., the breakaway 124, the nozzle 106, etc.) Furthermore, this configuration may allow the breakaway 124 to be cooled by the hydrogen fuel flowing through the fueling line 108 and the pre-cooling line 110. In this regard, the breakaway 124 may include several fittings and/or otherwise have a relatively high heat mass, and therefore may benefit from being cooled by the fueling line 108 and the pre-cooling line 110. Further still, this configuration allows for a breakaway point to be provided in both the fueling line 108 and pre-cooling line 110 at the breakaway 124.

In the pre-cooling state, the movement of hydrogen fuel through the fueling line 108 and into the pre-cooling circuit 102 may take place once, periodically, or continuously. For example, hydrogen fuel may be continuously circulated from the hydrogen fuel storage 104 through the fueling line 108 and the pre-cooling circuit 102. Alternatively, only the hydrogen fuel in the fueling line 108 at the time the fueling operation was discontinued may be moved through the fueling line 108 into the pre-cooling circuit 110, or the circulation of hydrogen fuel through the fueling line 108 and the pre-cooling circuit 102 may take place periodically.

The pre-cooling controller 120 may control the dispenser 100 to change between the fueling state and the pre-cooling state. The pre-cooling controller 120 may do so by controlling the flow-path selector 112 and/or the back-flow valve 114. The pre-cooling controller 120 may include a flow-path selector controller 142, a condition detector 144, a temperature detector 146, a fueling operation detector 148, and a timer 150.

The pre-cooling controller 120 may include one or more processors (arithmetic processors), computers, hardware elements, and software elements which are configured and/or programmed to provide above-listed components and to perform the herein-described functions. Particularly, each of the flow-path selector controller 142, the condition detector 144, the temperature detector 146, the fueling operation detector 148, and the timer 150 may be provided as one or more processors (arithmetic processors), computers, hardware elements, and software elements which are configured to perform the herein-described functions. It is to be appreciated that any of the flow-path selector controller 142, the condition detector 144, the temperature detector 146, the fueling operation detector 148, and the timer 150 may be combined with one another or provided as two or more elements.

The flow-path selector controller 142 may control the flow-path selector 112 to change the dispenser 100 between the fueling state and the pre-cooling state. The flow-path selector controller 142 may also be configured to control the back-flow valve 114 to open and block communication through the pre-cooling line 110 between the second and third portions 134, 136 thereof. Particularly, in the pre-cooling state, the flow-path selector controller 142 may control the flow-path selector 112 to open communication (hydrogen fuel flow) between the fueling line 108 and the pre-cooling line 110 (and may also control the flow-path selector 112 to block hydrogen fuel flow between the fueling line 108 and the nozzle, i.e., the nozzle line 126) and to control the back-flow valve 114 to open communication (hydrogen fuel flow) through the pre-cooling line 110 between the second and third portions 134, 136 thereof. In the fueling state, the flow-path selector controller 142 is configured to control the flow-path selector 112 to block communication (hydrogen fuel flow) between the fueling line 108 and the pre-cooling line 110 while opening communication (hydrogen fuel flow) between the fueling line 108 and the nozzle line 126 (the nozzle) and to control the back-flow valve 114 to block communication (hydrogen fuel flow) through the pre-cooling line 110 between the second and third portions 134, 136 thereof.

The dispenser 100 may be assumed to be in the fueling state unless a predetermined hydrogen fuel dispenser condition is detected by the condition detector 144. In this regard, the condition detector 144 detects the predetermined hydrogen fuel dispenser condition, and when detected, communicates the detection to the flow-path selector controller 142. The flow-path selector controller 142 controls the flow-path selector 112 and the back-flow valve 114 to place the dispenser 100 in the pre-cooling state when the predetermined hydrogen fuel dispenser condition is detected, and to otherwise place the dispenser 100 in the fueling state (i.e., when the predetermined hydrogen fuel dispenser condition is not detected).

The predetermined hydrogen fuel dispenser condition may be any condition which indicates that the dispenser 100 may benefit from pre-cooling using the pre-cooling circuit 102. In other words, the predetermined hydrogen fuel dispenser condition may be any condition which indicates that the fueling line 108, the nozzle 106, the breakaway 124, or any fittings are (or are susceptible to) heating. For example, the predetermined hydrogen fuel dispenser condition may include one or more of: a temperature of hydrogen fuel in the fueling line 108 exceeding a predetermined temperature; a discontinuation of the fueling operation; and a passage of a predetermined time following discontinuation of the fueling operation without (prior to) resumption of the fueling operation.

One or more of the temperature detector 146, the fueling operation detector 148, and the timer 150 may be used, in conjunction with the condition detector 144, to detect the predetermined hydrogen fuel dispenser condition. It is to be appreciated that any of the temperature detector 146, the fueling operation detector 148, and the timer 150 may be omitted when the predetermined hydrogen fuel dispenser condition(s) used to control the flow-path selector 112 and the back-flow valve 114 (i.e., the dispenser 100) do not require the information obtained/generated thereby. The below description will discuss the use of each of the temperature detector 146, the fueling operation detector 148, and the timer 150 in detecting the predetermined condition(s) associated therewith.

The temperature detector 146 communicates with the temperature sensor 122 to detect the temperature of hydrogen fuel in the fueling line 108. Particularly, the temperature sensor 122 senses the temperature of the hydrogen fuel in the fueling line 108, and communicates the sensed temperature to the temperature detector 146 (i.e., the pre-cooling controller 120). The temperature sensor 122 may be positioned between the hydrogen fuel storage 104 and the nozzle 106, and so may sense the temperature of the hydrogen fuel in the fueling line 108 at a position between the hydrogen fuel storage 104 and the nozzle 106. Consequently, the temperature detector 146 detects the temperature of the hydrogen fuel in the fueling line 108 at the position between the hydrogen fuel storage 104 and the nozzle 106.

The hydrogen fuel temperature detected by the temperature detector 146 is communicated to the condition detector 144. The condition detector 144 may then determine whether the hydrogen fuel temperature detected by the temperature detector 146 exceeds the predetermined temperature. If so, the condition detector 144 may detect the predetermined hydrogen fuel dispenser condition. Otherwise, the condition detector 144 may not detect the predetermined hydrogen fuel dispenser condition (i.e., may detect that the predetermined hydrogen fuel dispenser condition does not exist).

The predetermined temperature may be experimentally determined, modeled, etc., as the hydrogen fuel temperature within the fueling line 108 which may have an affect on the calculations performed during controlled fueling operations. Alternatively, the predetermined temperature may be experimentally determined, modeled, etc., as an upper limit of a desired hydrogen fuel temperature, or set arbitrarily.

The fueling operation detector 148 detects whether the fueling operation is taking place. Alternatively stated, the fueling operation detector 148 is configured to detect a discontinuation of the fueling operation (e.g., disengagement of the nozzle 106 from the receptacle).

The dispenser 100 may include any number of sensors or detectors which communicate with the fueling operation detector 148 to allow the fueling operation detector 148 to determine whether the fueling operation is taking place. For example, a sensor may be provided on the nozzle 106 to detect engagement of the nozzle 106 with the receptacle. When engaged, the fueling operation detector 148 may detect that the fueling operation is taking place; when disengaged, the fueling operation detector 148 may detect that the fueling operation is not taking place/is discontinued. Alternatively, a detection of flow rate of hydrogen fuel using a flow meter through any one or more of the fueling line 108 and the nozzle 106 may be used to determine whether the fueling operation is taking place.

The fueling operation detector 148 may communicate the detection of whether the fueling operation is taking place to the condition detector 144. When the fueling operation detector 148 detects that the fueling operation is discontinued (not taking place and/or has stopped), and communicates this detection to the condition detector 144, the condition detector 144 may detect the predetermined hydrogen fuel dispenser condition. When the fueling operation detector 148 detects that the fueling operation is taking place, and communicates this detection to the condition detector 144, the condition detector 144 may not detect the predetermined hydrogen fuel dispenser condition (i.e., may detect that the predetermined hydrogen fuel dispenser condition does not exist).

The timer 150 detects a time passed following a discontinuation of the fueling operation. The timer 150 may communicate with the fueling operation detector 148 to receive an input at a time when the fueling operation is detected to be discontinued. The timer 150 then detects a time passed following the discontinuation of the fueling operation without (prior to) a resumption of the fueling operation (i.e., a time between fueling operations).

The timer 150 may detect the passage of a predetermined time following discontinuation of the fueling operation without (prior to) resumption of the fueling operation. The predetermined time may be, e.g., experimentally determined, modeled, etc., as a time required for hydrogen fuel in the fueling line 108 to increase to the predetermined temperature. Alternatively, the predetermined time may be arbitrarily set.

The timer 150 may communicate with the condition detector 144 when the passage of the predetermined time following discontinuation of the fueling operation without (prior to) resumption of the fueling operation is detected. Upon receipt of this communication, the condition detector 144 may detect the predetermined hydrogen fuel dispenser condition. If this communication is not received, and when the condition detector 144 receives an input from the fueling operation detector 148 indicating that the fueling operation has resumed, the condition detector 144 may not detect the predetermined hydrogen fuel dispenser condition (i.e., may detect that the predetermined hydrogen fuel dispenser condition does not exist).

As an alternative to the above, the timer 150 may simply detect the time passed following discontinuation of the fueling operation, and communicate the time information to the condition detector 144. The condition detector 144 may then determine whether the time passed, as communicated by the timer 150, exceeds the predetermined time. If so, the condition detector 144 may detect the predetermined hydrogen fuel dispenser condition; otherwise, the condition detector 144 may not detect the predetermined hydrogen fuel dispenser condition (i.e., may detect that the predetermined hydrogen fuel dispenser condition does not exist).

Any or all of the above mechanisms may be used to detect the predetermined hydrogen fuel dispenser condition. Moreover, the above mechanisms may be combined with one another. For example, the condition detector 144 may receive inputs from all of the temperature detector 146, the fueling operation detector 148, and the timer 150, and may detect the predetermined hydrogen fuel dispenser condition when at least one of: the temperature of hydrogen fuel in the fueling line 108 is detected by the temperature detector 146 to exceed the predetermined temperature; discontinuation of the fueling operation is detected by the fueling operation detector 148; and the passage of the predetermined time is detected by the timer 150.

As another example, the condition detector 144 may detect the predetermined hydrogen fuel dispenser condition when either: the temperature of hydrogen fuel in the fueling line 108 is detected by the temperature detector 146 to exceed the predetermined temperature; or passage of the predetermined time is detected by the timer 150. As another example, the condition detector 144 may receive inputs from both the temperature detector 146 and the fueling operation detector 148. In such a configuration, the condition detector 144 may detect the predetermined hydrogen fuel dispenser condition when both: the temperature detector 146 detects that the hydrogen fuel temperature exceeds the predetermined temperature; and the fueling operation detector 148 detects discontinuation of the fueling operation. Furthermore, the condition detector 144 may be operated by an operator to select the specific input by which the detection of the predetermined hydrogen fuel dispenser condition is made.

As noted above, when the predetermined hydrogen fuel dispenser condition is detected by the condition detector 144, the flow-path selector controller 142 may control the flow-path selector 112 (or the flow-path selector 112 and the back-flow valve 114) to place the dispenser 100 in the pre-cooling state. When the predetermined hydrogen fuel dispenser condition is not detected by the condition detector 144 (i.e., is detected to not exist), the flow-path selector controller 142 may control the flow-path selector 112 (or the flow-path selector 112 and the back-flow valve 114) to place the dispenser 100 in the fueling state.

As also noted above, circulating the hydrogen fuel through the pre-cooling circuit 102 may be continuously performed once the predetermined hydrogen fuel dispenser condition is detected, may be performed only for hydrogen fuel in the fueling line 108 at the time the predetermined hydrogen fuel dispenser condition is detected, or may be periodically done. For example, the pre-cooling controller 120 may continuously monitor the hydrogen fuel temperature, and circulate hydrogen fuel through the pre-cooling circuit 102 only so long as the hydrogen fuel temperature remains above the predetermined temperature. Once the hydrogen fuel temperature drops below the predetermined temperature, the predetermined hydrogen fuel dispenser condition may no longer be detected (i.e., may be detected to not exist), and the flow-path selector controller 142 may control the flow-path selector 112 (or the flow-path selector 112 and the back-flow valve 114) to change the dispenser 100 from the pre-cooling state to the fueling state.

It is to be appreciated that while the pre-cooling controller 120 is described above as operating in consideration of the temperature of hydrogen fuel within the fueling line 108, the pre-cooling controller 120 may alternatively operate based on a temperature of any or all of the fueling line 108, the nozzle 106, the breakaway 124, and the fittings. That is, the temperature sensor 122 may measure the temperature of any or all of the fueling line 108, the nozzle 106, the breakaway 124, and the fittings, the temperature detector 146 may therefore detect the temperature of any or all of the fueling line 108, the nozzle 106, the breakaway 124, and the fittings, and the condition detector 144 may detect or not detect the predetermined hydrogen fuel dispenser condition based on the detected temperature of any or all of the fueling line 108, the nozzle 106, the breakaway 124, and the fittings.

The dispenser 100 and pre-cooling circuit 102 are described above as having the pre-cooling circuit 102 feed the hydrogen fuel from the fueling line 108 back into the hydrogen fuel storage 104 for high pressure storage, and eventual feeding back into the fueling line 108. However, the pre-cooling circuit 102 may be configured to direct hydrogen fuel to someplace other than the hydrogen fuel storage 104. The pre-cooling circuit 102 is configured to circulate the hydrogen fuel to cool the hydrogen fuel, the fueling line 108, the nozzle 106, the breakaway 124, and any fittings. A pre-cooling circuit connected to the fueling line 108 at one end and having any terminal point is considered to be within the scope of the instant disclosure.

Figure 3:
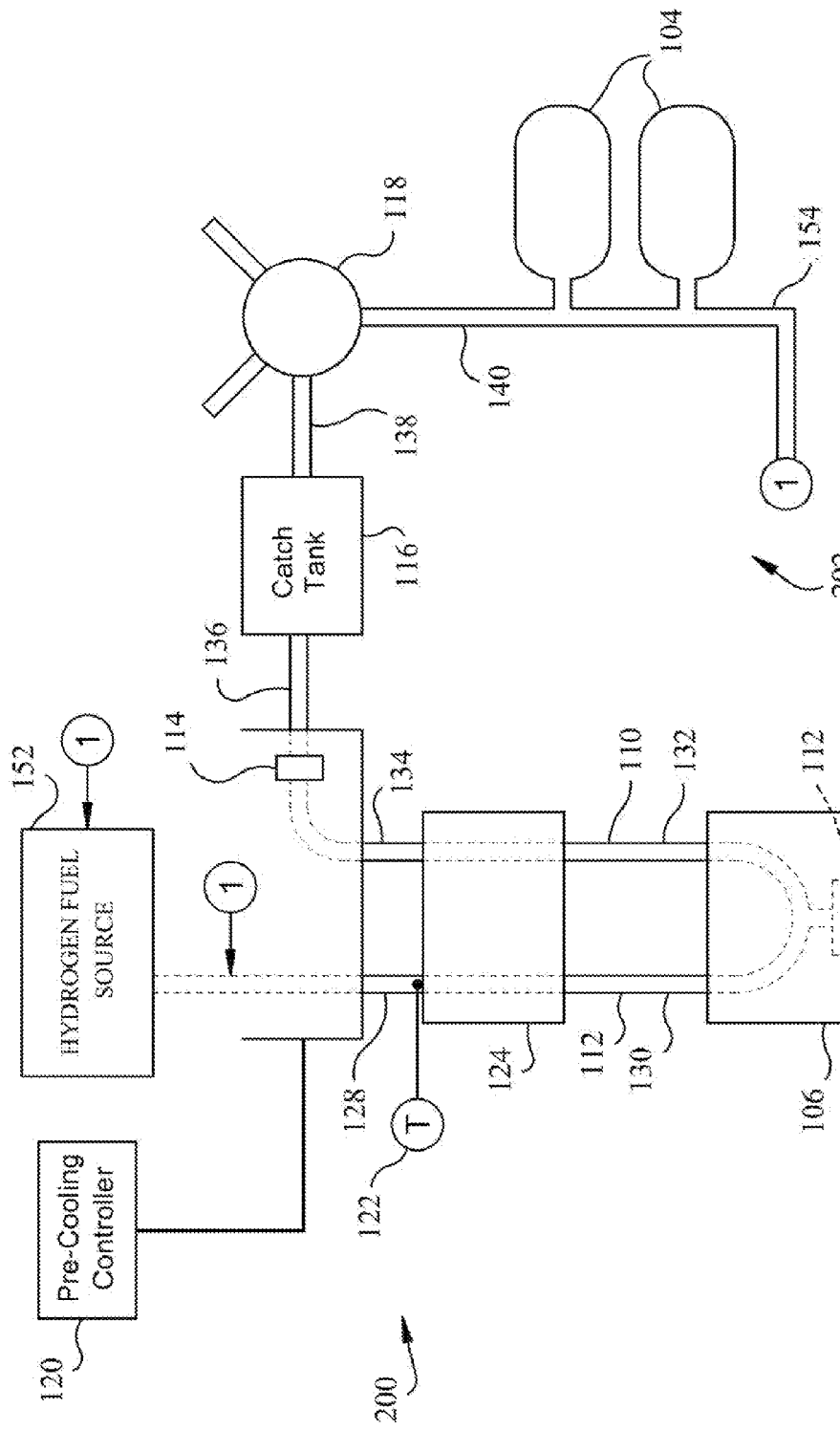
FIG. 3 is a schematic illustration of an exemplary hydrogen fuel dispenser which includes a pre-cooling circuit which feeds hydrogen fuel to various portions of the hydrogen fuel dispenser in accordance with one embodiment of the present application.

Referring to FIG. 3, a hydrogen fuel dispenser 200 (hereinafter, "dispenser 200") is shown with a pre-cooling circuit 202 that directs hydrogen fuel from the fueling line 108 to someplace other than the hydrogen fuel storage 104. The dispenser 200 is substantially similar to the dispenser 100. The same reference numerals are used to indicate components in the dispenser 200 which are the same as those in the dispenser 100.

In the dispenser 200, hydrogen fuel may be fed into the fueling line 108 from the hydrogen fuel source 152. The feeding of the hydrogen fuel into the fueling line 108 from the hydrogen fuel source 152 may be direct or indirect. Additionally, in the pre-cooling circuit 202, the pre-cooling line 110 may feed hydrogen fuel from the fueling line 108 to the catch tank 116, through the compressor 118, and into the hydrogen fuel storage 104.

The pre-cooling circuit 202 of the dispenser 200 may further include a recirculation line 154 which takes hydrogen fuel from one of the hydrogen fuel storage 104 and the compressor 118. The recirculation line 154 may feed the hydrogen fuel from the hydrogen fuel storage 104 and the compressor 118 into the fueling line 108 at a position upstream from the connection between the fueling line 108 and the pre-cooling line 110. Alternatively, the recirculation line 154 may feed the hydrogen fuel from the hydrogen fuel storage 104 and the compressor 118 into the hydrogen fuel source 152. As a further alternative, the hydrogen fuel may be released into the atmosphere. In FIG. 3, the end of the recirculation line 154 is indicated with reference numeral 1. As shown, the end 1 may terminate at the hydrogen fuel source 152 or at the fueling line 108 in the first portion 128 thereof.

Though not shown, the end 1 may terminate as an outlet which releases the hydrogen fuel into the atmosphere. Depending on the end 1 used, the hydrogen fuel storage 104, the compressor 118, and/or the catch tank 116 may be omitted. For example, hydrogen fuel may be released into the atmosphere prior to reaching the catch tank 116; in such a configuration, the catch tank 116, the compressor 118, and the hydrogen fuel storage 104 may be omitted.

It is to be appreciated that additional regulating mechanisms may be employed to control the flow of the hydrogen fuel during fueling. Alternatively, the flow-path selector 112 may serve as the only or primary regulating mechanism used to regulate the flow and dispensing of hydrogen fuel during fueling (i.e., the flow-path selector 112 may selectively block and open the nozzle line 126, in different degrees, to control the flow and dispensing of hydrogen fuel).

The above description discusses the heating of the fueling line 108, the breakaway 124, the nozzle 106, and the fittings of the dispenser 100. However, it is to be appreciated that only a subset of these components may experience heating between fueling operations. It is also to be appreciated that the dispenser 100 may include other components that may be heated between fueling operations.

Figure 4:
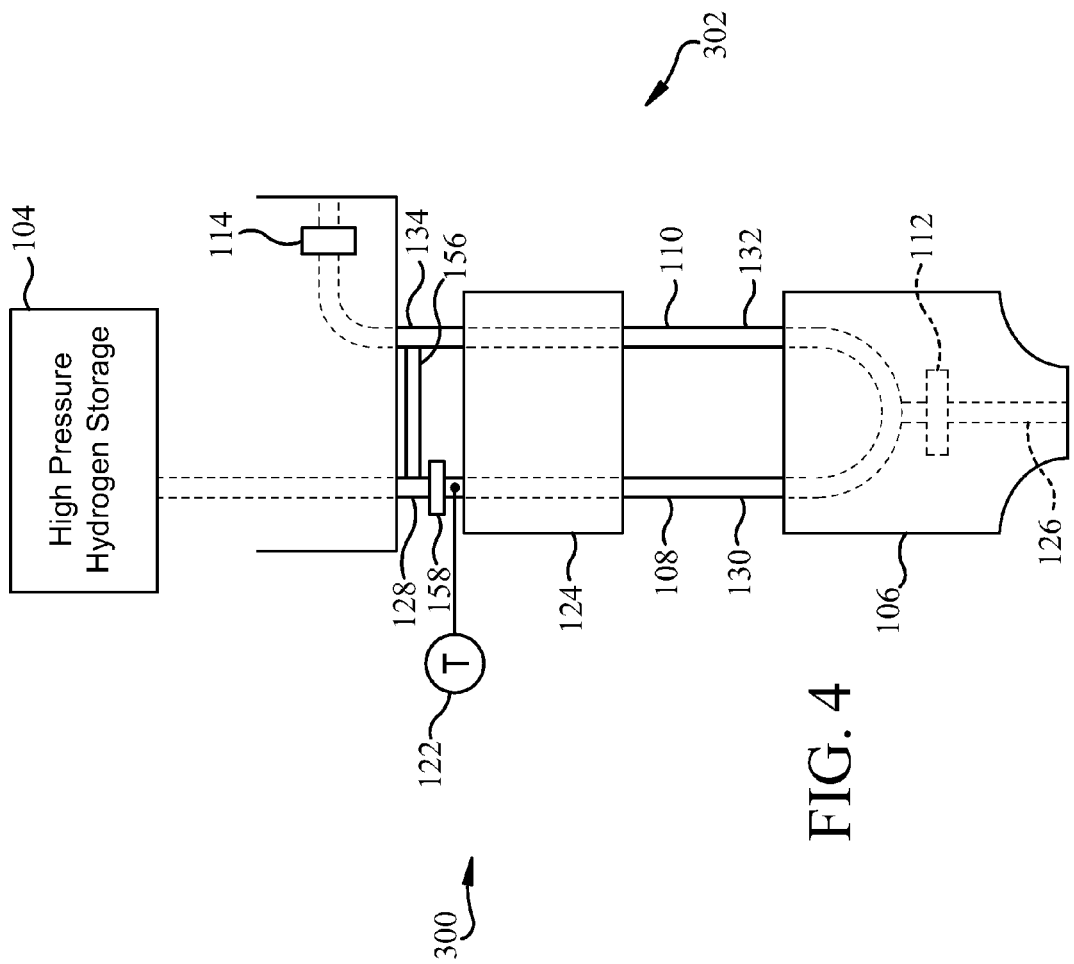
FIG. 4 is a schematic illustration of an exemplary hydrogen fuel dispenser which includes a pre-cooling circuit and a flow-path selector located upstream from a breakaway, in accordance with one embodiment of the present application.

Moreover, the flow-path selector may be positioned at different and/or additional locations in the hydrogen fuel dispenser. For example, FIG. 4 shows a hydrogen fuel dispenser 300 (hereinafter, "dispenser 300") including a pre-cooling circuit 302 that allows for a position within the dispenser 300 at which the hydrogen fuel may be diverted from the fueling line 108 to the pre-cooling line 110 to be changed or modified. The dispenser 300 and the pre-cooling circuit 302 shown in FIG. 4 are similar to those shown in FIG. 1. Elements in FIG. 4 that are identical to those in FIG. 1 are either illustrated using similar reference numerals or not shown.

The pre-cooling circuit 302 allows for the position at which the hydrogen fuel may be diverted from the fueling line 108 to the pre-cooling line 110 to be selectively changed by providing an upstream pre-cooling line 156 and an upstream flow-path selector 158. The upstream flow-path selector 158 is provided in addition to the flow-path selector 112 provided in the nozzle 106. The upstream pre-cooling line 156 and the upstream flow-path selector 158 are provided at a position upstream from the breakaway 124, between the breakaway 124 and the hydrogen fuel storage 104. Accordingly, hydrogen fuel may be diverted from the fueling line 108 to the pre-cooling line 110 at a position upstream from the breakaway 124 (via the upstream pre-cooling line 156 and the upstream flow-path selector 158) or at the nozzle (via the first portion 132 of the pre-cooling line 110 and the flow-path selector 112).

The upstream flow-path selector 158 may take the form of any element or gas flow controlling mechanism capable of regulating and controlling a flow of hydrogen fuel from the fueling line 108 to the upstream pre-cooling line 156. For example, the upstream flow-path selector 158 may be a three-way valve. The upstream flow-path selector 158 may be similar or identical to the flow-path selector 112 located in the nozzle 106.

The upstream pre-cooling line 156 connects to the first portion 128 of the fueling line 108 at a first end, and to the second portion 134 of the pre-cooling line 110 at a second end opposite to the first end, so as to define a hydrogen fuel flow path between the fueling line 108 and the pre-cooling line 110. Hydrogen fuel may thereby be fed into the pre-cooling circuit 302 prior to reaching the breakaway 124 and nozzle 106. The upstream flow-path selector 158 may operate in a manner similar to that of the flow-path selector 112 located in the nozzle 106 to change the dispenser 300 between the fueling state and the pre-cooling state.

The upstream flow-path selector 158 selectively blocks/opens communication (hydrogen fuel flow) between the fueling line 108 and the pre-cooling line 110 via the upstream pre-cooling line 156 to change the dispenser 300 between the fueling state and the pre-cooling state. In the fueling state, the upstream flow-path selector 158 opens a flow-path through the fueling line 108 so as to allow hydrogen fuel to flow to the nozzle 106. The upstream flow-path selector 158 may also block a flow-path between the fueling line 108 and the pre-cooling line 110 via the upstream pre-cooling line 156. The back-flow valve 114 may also block communication between the second and third portions 134, 136 of the pre-cooling line 110 when in the fueling state.

Additionally, as discussed above, in the fueling state the flow-path selector 112 may also open a flow-path between the fueling line 108 and the nozzle line 126 (the nozzle) so as to open communication (hydrogen fuel flow) between the two, and block a flow-path between the fueling line 108 and the pre-cooling line 110 so as to block communication (hydrogen fuel flow) between the two. Therefore, in the fueling state hydrogen fuel may flow from the hydrogen fuel storage 104, through the fueling line 108, to the nozzle 106. Hydrogen fuel may also be prevented from flowing into and through the pre-cooling line 110 by the flow-path selector 112, the upstream flow-path selector 158, and/or the back-flow valve 114.

In the pre-cooling state, the upstream flow-path selector 158 may open the flow-path between fueling line 108 and the pre-cooling line 110 via the upstream pre-cooling line 156 so as to open communication (hydrogen fuel flow) between the two. The upstream flow-path selector 158 may also block communication (hydrogen fuel flow) through the fueling line 108 to the nozzle 106. As discussed above, the dispenser may also be placed into the pre-cooling state by the flow-path selector 112 opening the flow-path between fueling line 108 and the pre-cooling line 110 so as to open communication (hydrogen fuel flow) between the two. The flow-path selector 112 may also block communication (hydrogen fuel flow) between the fueling line 108 and the nozzle line 126 (the nozzle). Therefore, in the pre-cooling state hydrogen fuel may flow from the fueling line 108 to the pre-cooling line 110 via the upstream pre-cooling line 156 and/or via the first portion 132 of the pre-cooling line 110. Hydrogen fuel may also be prevented from flowing to the nozzle 106 by the upstream flow-path selector 158, and/or from flowing to the nozzle line 126 by the flow-path selector 112.

The pre-cooling controller 120 (not illustrated in FIG. 4) may control the flow-path selector 112 and the upstream flow-path selector 158 together or independently from one another according to the algorithm described above. Moreover, the pre-cooling controller 120 may control the flow-path selector 112 and the upstream flow-path selector 158 independently from one another based on various additional measurements made of the dispenser 300.

For example, the upstream flow-path selector 158 may be controlled by the pre-cooling controller 120 to block the upstream pre-cooling line 156 while the flow-path selector 112 is controlled to open communication between the fueling line 108 and the pre-cooling line 110 (the dispenser 300 is in the pre-cooling state) when the predetermined hydrogen fuel dispenser condition is detected and a temperature of any one or more of the breakaway 124, the nozzle 106, and the fueling line 108 (at a position downstream from the upstream flow-path selector 158) exceeds a predetermined threshold temperature. Doing so will cause hydrogen fuel to pass through the fueling line 108 and the pre-cooling line 110 in the vicinity of the breakaway 124 and the nozzle 106, so that the breakaway 124 and the nozzle 106, as well as the fueling line 108 and the pre-cooling line 110, may be cooled by the hydrogen fuel.

Alternatively, when the predetermined hydrogen fuel dispenser condition is detected and the temperature of any one or more of the breakaway 124, the nozzle 106, and the fueling line 108 (at a position downstream from the upstream flow-path selector 158) is less than the predetermined threshold temperature, the upstream flow-path selector 158 may be controlled by the pre-cooling controller 120 to open the upstream pre-cooling line 156. Doing so will prevent or reduce the amount of hydrogen fuel passing through the fueling line 108 and the pre-cooling line 110 in the vicinity of the breakaway 124 and the nozzle 106.

By controlling the flow-path selector 112 and the upstream flow-path selector 158 based on the temperature of any one or more of the breakaway 124, the nozzle 106, and the fueling line 108 at a position downstream from the upstream flow-path selector 158, the pre-cooling circuit 302 may provide a single dispenser which may be used in various climates. For example, if the dispenser 300 is in an environment wherein the components thereof will not heat (e.g., the dispenser 300 is in a cold climate environment), the upstream flow-path selector 158 may be utilized to switch between the fueling state and the pre-cooling state. Alternatively, if the dispenser 300 is in an environment wherein the components thereof will heat (e.g., the dispenser 300 is in a warm climate environment), the flow-path selector 112 may be utilized to switch between the fueling state and the pre-cooling state.

It is to be appreciated that the above-described control of the dispenser 300 may be facilitated by the inclusion of additional sensors, for example temperature sensors that measure the temperature of the breakaway 124 and the nozzle 106. It is also to be appreciated that the pre-cooling circuit 302 including the upstream pre-cooling line 156 and the upstream flow-path selector 158 may be incorporated in the dispenser 200 shown in FIG. 3.

Figure 5:
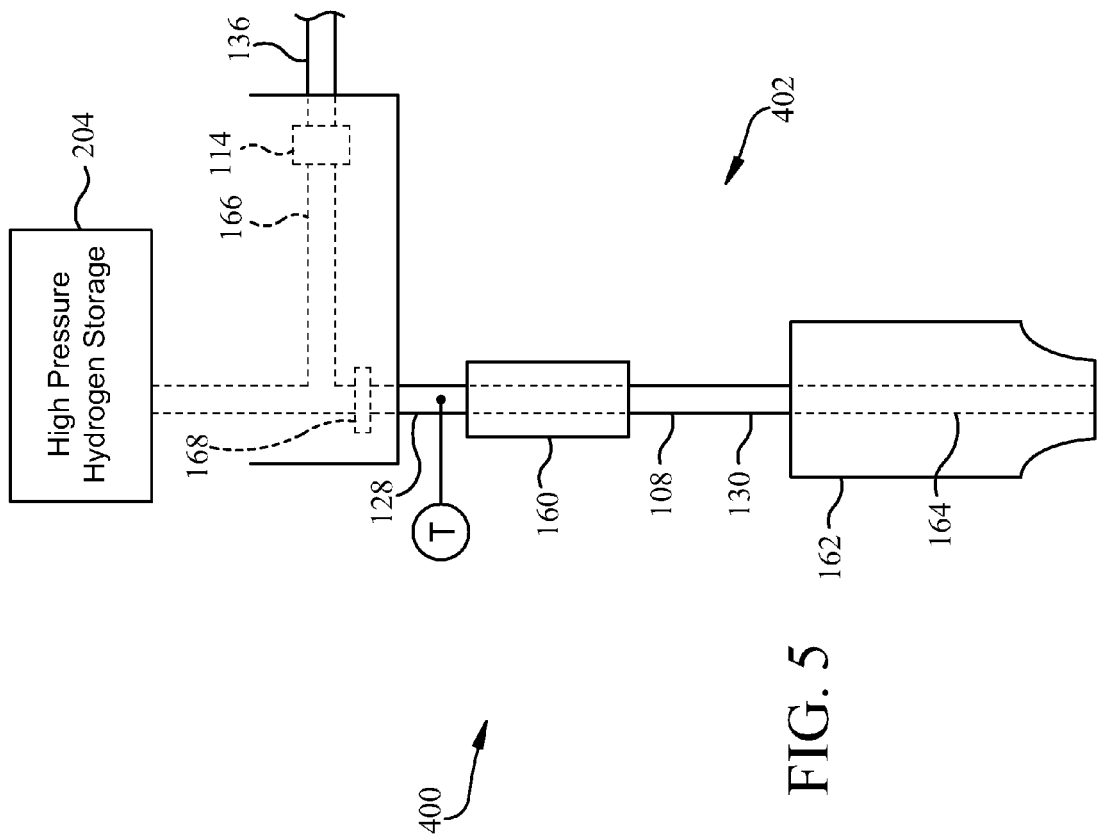
FIG. 5 is a schematic illustration of an exemplary hydrogen fuel dispenser which includes a flow-path selector located upstream from a breakaway, in accordance with one embodiment of the present application.

Turning to FIG. 5, a hydrogen fuel dispenser 400 (hereinafter, "dispenser 400") including a pre-cooling circuit 402 is shown. The dispenser 400 and the pre-cooling circuit 402 shown in FIG. 5 are similar to those shown in FIG. 1. Elements in FIG. 5 that are identical to those in FIG. 1 are either illustrated using similar reference numerals or not shown.

As with the dispenser 100 shown in FIG. 1, the dispenser 400 shown in FIG. 5 includes the hydrogen fuel storage 204, a nozzle 162, and the fueling line 108 connecting the hydrogen fuel storage 204 to the nozzle 162. Unlike the pre-cooling circuit 102 shown in FIG. 1, the pre-cooling circuit 402 shown in FIG. 5 does not include the first and second portions 132, 134 of the pre-cooling line 110. Rather, the first and second portions 132, 134 of the pre-cooling line 110 are replaced by an upstream pre-cooling line 166. Additionally, the pre-cooling circuit 402 includes an upstream flow-path selector 168 located at a junction between the fueling line 108 and the upstream pre-cooling line 166, and the nozzle 162 includes only a single nozzle line 164 that communicates with the fueling line 108.

The upstream flow-path selector 168 and the upstream pre-cooling line 166 operate in a manner similar to that of the secondary flow-path selector 158 and the secondary pre-cooling feeder line 156 shown in FIG. 4. Particularly, the upstream pre-cooling line 166 and the upstream flow-path selector 168 are disposed upstream from the breakaway 124, between the breakaway 124 and the hydrogen fuel storage 104. The upstream flow-path selector 168 is operable to selectively open/block communication (hydrogen fuel flow) through the upstream pre-cooling line 166 to the pre-cooling circuit 402 (i.e., the third portion 136 of the pre-cooling line 110). The upstream flow-path selector 168 may also selectively open/block communication (hydrogen fuel flow) through the fueling line 108 to the nozzle 162 and nozzle line 164.

By selectively opening/blocking hydrogen fuel flow through the upstream pre-cooling line 166 and/or the fueling line 108, the upstream flow-path selector may switch the dispenser 400 between the fueling state and the pre-cooling state. In the pre-cooling state, hydrogen fuel may be diverted from the fueling line 108 into the pre-cooling circuit 402 at the position upstream from the breakaway 124 for cooling. In the fueling state, hydrogen fuel may flow through the fueling line 108 to the nozzle 162 and nozzle line 164 for dispensing.

As shown in FIG. 5, the upstream flow-path selector 168 serves as an only flow-path selector, and the upstream pre-cooling line 166 serves as an only communication channel between the fueling line 108 and the pre-cooling circuit 402. The upstream flow-path selector 168 may be controlled by the pre-cooling controller 120 according to the algorithm described above.

The configuration shown in FIG. 5, with the upstream pre-cooling line 166 and the upstream flow-path selector 168 disposed upstream from the breakaway 124, may eliminate the need to provide a new nozzle and breakaway. Therefore, the configuration shown in FIG. 5 may be implemented more easily than the configurations shown in FIGS. 1, 3, and 4, especially when an existing hydrogen fuel dispenser is retrofitted to include the herein-described pre-cooling circuit(s).

Figure 6:
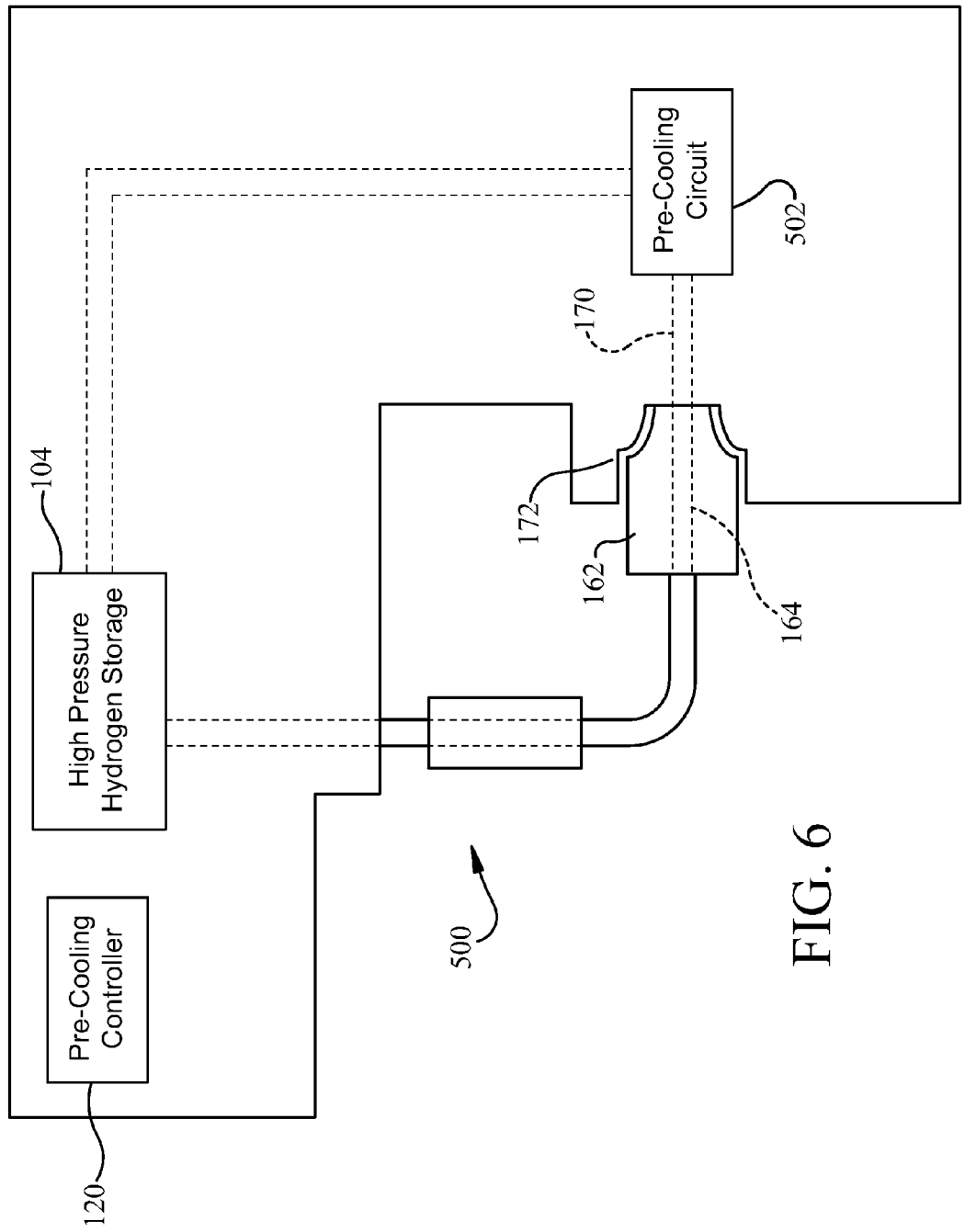
FIG. 6 is a schematic illustration of an exemplary hydrogen fuel dispenser which includes a pre-cooling circuit and a flow-path selector located downstream from a nozzle, in accordance with one embodiment of the present application.

Referring to FIG. 6, an additional exemplary configuration for a hydrogen fuel dispenser 500 (hereinafter, "dispenser 500") having a pre-cooling circuit 502 is shown. The dispenser 500 shown in FIG. 6 is similar to that shown in FIG. 5. However, the upstream flow-path selector 168 and the upstream pre-cooling line 166 are replaced by a downstream pre-cooling line 170. The downstream pre-cooling line 170 connects to the pre-cooling circuit 502, the particular components of which are not shown. Particularly, the downstream pre-cooling line 170 connects to the pre-cooling line of the pre-cooling circuit 502 (not shown). The downstream pre-cooling line 170 is provided so that an open end thereof is provided within a holster 172 of the dispenser 500 so that the nozzle line 164 of the nozzle 162 engages and communicates with the pre-cooling line 170 when the nozzle 162 is engaged with and held by the holster 172 (i.e., the nozzle 162 is stowed).

When the nozzle 162 is not being used and is stowed in engagement with the holster 172, the nozzle line 164 of the nozzle 162 engages with the downstream pre-cooling line 170 to define a hydrogen fuel flow path between the nozzle line 164 and the pre-cooling circuit 502. The pre-cooling circuit 502 may otherwise include the same components of the pre-cooling circuits described above.

By the configuration shown in FIG. 6, the dispenser 500 may be placed in the pre-cooling state by engaging the nozzle 162 in the holster 172 so as to define the hydrogen fuel flow path between the nozzle line 164 and the downstream pre-cooling line 170. The dispenser may be placed in the fueling state by removing the nozzle 162 from the holster 172.

The dispenser 500 need not always be in the pre-cooling state when the nozzle 162 is stowed in the holster 172. Rather, the pre-cooling controller 120 may initiate a change of the dispenser 500 into the pre-cooling state when the nozzle 162 is engaged with the holster 172 and the predetermined hydrogen fuel dispenser condition is detected in the manner discussed above. The initiation of the change may be controlled by driving hydrogen fuel through the fueling line 108 and the nozzle line 164 into the downstream pre-cooling line 170. Alternatively, a downstream flow-path selector (not shown) may be provided in the downstream pre-cooling line 170.

As a further alternative, the change of a hydrogen fuel dispenser into the pre-cooling state, and the pre-cooling operation, may be initiated according to alternative or additional considerations. For example, the pre-cooling operation may be initiated when an impending fueling event is detected. The impending fueling event may be detected when a credit card is swiped at the hydrogen fuel dispenser, or when a PIN code is activated at the hydrogen fuel dispenser. Additionally or alternatively, the impending fueling event may be detected by detecting a vehicle within a predetermined proximity of the hydrogen fuel dispenser using a proximity detector.

Figure 2:
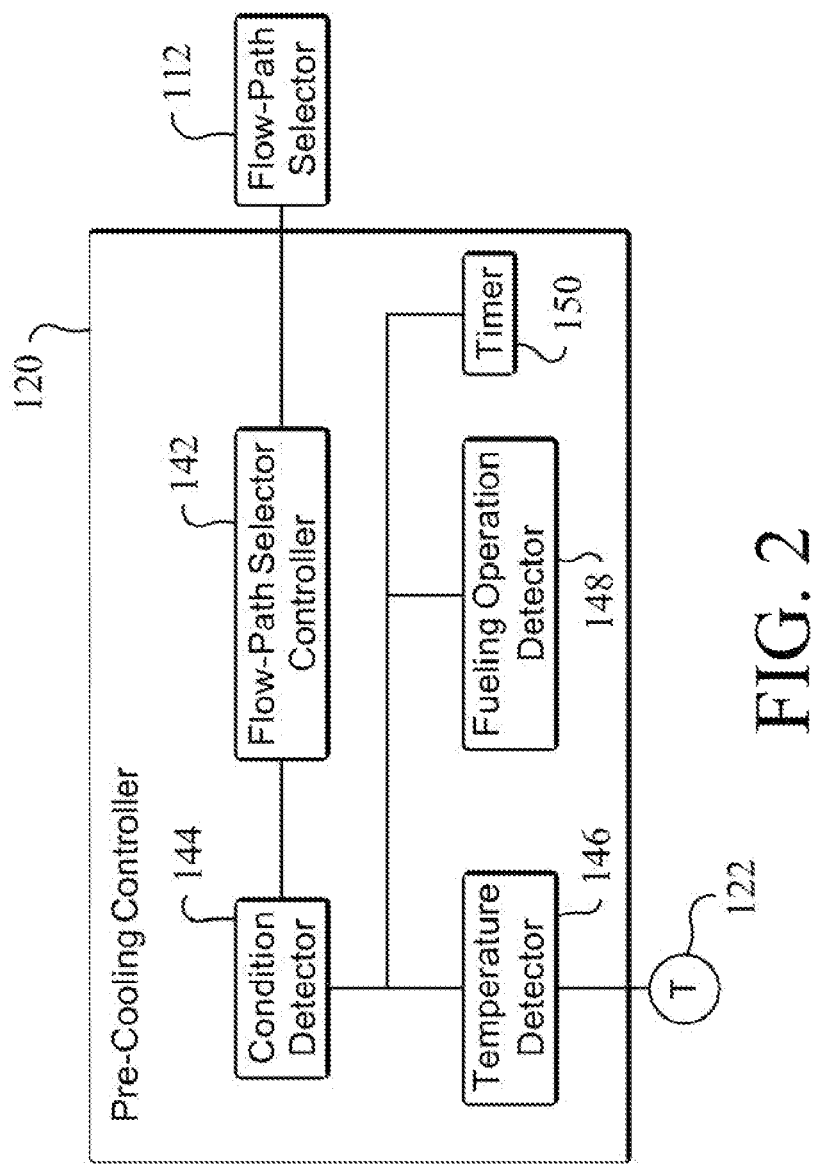
FIG. 2 is a block schematic showing an exemplary pre-cooling controller of the dispenser shown in FIG. 1 in accordance with one embodiment of the present application.
Figure 7:
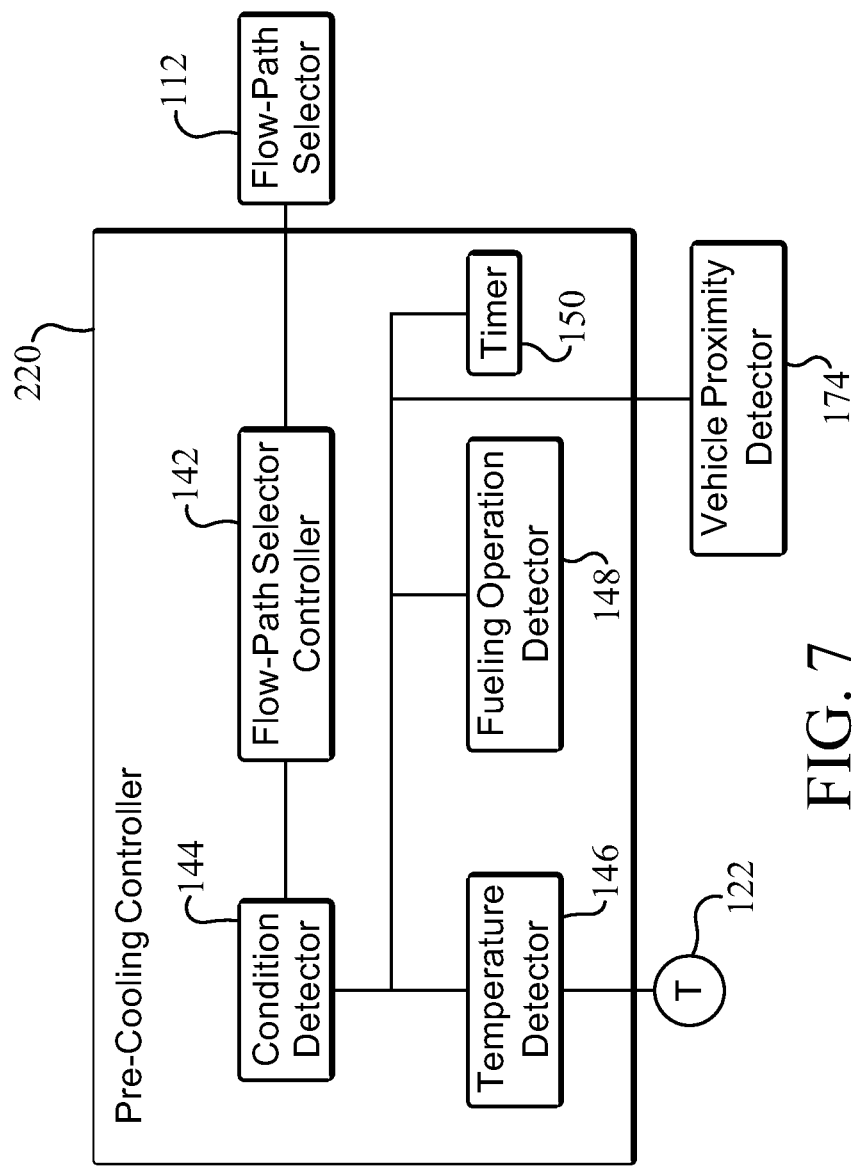
FIG. 7 is a block schematic showing an exemplary pre-cooling controller of a hydrogen fuel dispenser in accordance with one embodiment of the present application.

Referring to FIG. 7, an exemplary alternative pre-cooling controller 220 is shown. The exemplary alternative pre-cooling controller 220 is identical to the pre-cooling controller 120 shown in FIG. 2 except for the inclusion of a vehicle proximity detector 174. The vehicle proximity detector 174 may include components, or may communicate with existing components of the hydrogen fuel dispenser, to detect the impending fueling event.

For example the vehicle proximity detector 174 may communicate with a payment module (not shown) provided in the hydrogen fuel dispenser to detect a credit or debit card swipe, or the entry of a PIN. Once such a detection (of a payment) is made, the vehicle proximity detector 174 may detect the impending fueling event. Additionally or alternatively, the vehicle proximity detector 174 may include a camera or other visual detector to detect the presence of a vehicle in the vicinity of the hydrogen fuel dispenser (i.e., a vehicle parked in front of the hydrogen fuel dispenser), a weight sensor on the ground in front of the hydrogen fuel dispenser to detect the presence of a vehicle in the vicinity of the hydrogen fuel dispenser (i.e., a vehicle parked in front of the hydrogen fuel dispenser), or any other known mechanism for detecting the presence of a vehicle in a particular location.

Once the impending fueling operation is detected by the vehicle proximity detector 174, the information is communicated to the condition detector 144. The condition detector 144 may detect the predetermined hydrogen fuel dispenser condition any time the vehicle proximity detector 174 detects the impending fueling event. Alternatively, the condition detector 144 may utilize the input from the vehicle proximity detector 174 as another variable in detecting the predetermined hydrogen fuel dispenser condition. For example, the condition detector 144 may detect the predetermined hydrogen fuel dispenser condition when the impending fuel event is detected and any of the above-described other conditions are met. It is to be appreciated that the condition detector 144 may detect the predetermined hydrogen fuel dispenser condition based on any combination of the parameters determined by the temperature detector 146, the fueling operation detector 148, the timer 158, and the vehicle proximity detector 174.

The pre-cooling controller 220 may also be configured to control the associated hydrogen fuel dispenser to prevent the hydrogen fuel dispenser from initiating the fueling operation until a pre-cooling operation is carried out. For example, the pre-cooling controller 220 may prevent the fueling operation from commencing until a predetermined time period passes following detection of the impending fueling event is detected. The predetermined time period may be a period of time required for the pre-cooling operation to be carried out.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hydrogen fuel dispenser, comprising:
   a nozzle for engaging and dispensing hydrogen fuel to a receptacle, the nozzle including a nozzle line, disposed within a nozzle body, through which hydrogen fuel is dispensed to the receptacle;
   a fueling line connecting the nozzle line to a hydrogen fuel storage for communicating hydrogen fuel from the hydrogen fuel storage to the nozzle line, the fueling line connecting to the nozzle line within the nozzle body;
   a pre-cooling line connected to the fueling line downstream from the hydrogen fuel storage, within the nozzle body, for pre-cooling hydrogen fuel; and
   a flow-path selector provided at a connection between the fueling line and the pre-cooling line within the nozzle body, the flow-path selector selectively: blocking hydrogen fuel flow between the fueling line and the pre-cooling line while opening hydrogen fuel flow between the fueling line and the nozzle line; and opening hydrogen fuel flow between the fueling line and the pre-cooling line.

2. The hydrogen fuel dispenser according to claim 1, comprising:
   a pre-cooling controller detecting a predetermined hydrogen fuel dispenser condition, and controlling the flow-path selector to:
   open hydrogen fuel flow between the fueling line and the pre-cooling line when the predetermined hydrogen fuel dispenser condition is detected, otherwise block hydrogen fuel flow between the fueling line and the pre-cooling line while opening hydrogen fuel flow between the fueling line and the nozzle line.

3. The hydrogen fuel dispenser according to claim 2, wherein the predetermined hydrogen fuel dispenser condition is at least one of a temperature of hydrogen fuel in the fueling line exceeding a predetermined temperature, a discontinuation of a fueling operation of dispensing hydrogen fuel to the receptacle, a passage of a predetermined time following discontinuation of the fueling operation prior to resumption of the fueling operation, and an impending fueling event.

4. The hydrogen fuel dispenser according to claim 2, wherein the predetermined hydrogen fuel dispenser condition is an impending fueling event.

5. The hydrogen fuel dispenser according to claim 4, wherein the impending fueling event is detected based upon at least one of: a detection of payment at the hydrogen fuel dispenser and a detection of a vehicle in a vicinity of the hydrogen fuel dispenser.

6. The hydrogen fuel dispenser according to claim 1, comprising:
   a catch tank provided in the pre-cooling line, the catch tank holding hydrogen fuel at a low pressure.

7. The hydrogen fuel dispenser according to claim 6, comprising:
   a compressor provided in the pre-cooling line at a position downstream from the catch tank, the compressor compressing hydrogen fuel from the catch tank for high pressure storage.

8. The hydrogen fuel dispenser according to claim 7, wherein the pre-cooling line connects the fueling line to the hydrogen fuel storage with the catch tank and the compressor disposed between the fueling line and the hydrogen fuel storage, the catch tank holding hydrogen fuel at low pressure, and the compressor compressing hydrogen fuel from the catch tank for high pressure storage in the hydrogen fuel storage.

9. The hydrogen fuel dispenser according to claim 1, wherein the pre-cooling line connects the fueling line with the hydrogen fuel storage such that hydrogen fuel flows through the pre-cooling line from the fueling line to the hydrogen fuel storage.

10. The hydrogen fuel dispenser according to claim 1, wherein the pre-cooling line communicates hydrogen fuel back into the fueling line at a position upstream from the connection between the fueling line and the pre-cooling line.

* * * * *